United States Patent
Meidan et al.

[11] Patent Number: 5,936,972
[45] Date of Patent: Aug. 10, 1999

[54] SYNDROME-BASED CHANNEL QUALITY OR MESSAGE STRUCTURE DETERMINER

[75] Inventors: Reuven Meidan, Hasharon; Meir Ariel, Tel Aviv, both of Israel

[73] Assignee: Motorola, Inc., Schaumburg, Ill.

[21] Appl. No.: 08/878,280

[22] Filed: Jun. 18, 1997

[51] Int. Cl.$^6$ .................................................. G01R 31/28
[52] U.S. Cl. ........................ 371/20.1; 371/5.1; 371/67.1; 370/333
[58] Field of Search .................................... 371/20.1, 5.1, 371/37.01, 37.07, 37.12, 67.1, 68.1, 68.2; 375/316, 324; 370/310, 333, 912, 913

[56] References Cited

U.S. PATENT DOCUMENTS

| | | | |
|---|---|---|---|
| 4,354,269 | 10/1982 | Vries et al. ................................ | 371/43 |
| 4,486,882 | 12/1984 | Piret et al. ................................ | 371/45 |
| 4,688,207 | 8/1987 | Yoshimoto . | |
| 4,716,573 | 12/1987 | Bergström et al. ...................... | 375/202 |
| 4,937,536 | 6/1990 | Reinhardt et al. ........................... | 331/8 |
| 5,121,408 | 6/1992 | Cai et al. ................................ | 375/202 |
| 5,194,860 | 3/1993 | Jones et al. ........................ | 340/870.02 |
| 5,235,613 | 8/1993 | Brown et al. ........................... | 370/202 |
| 5,301,197 | 4/1994 | Yamada et al. ........................... | 371/5.1 |
| 5,463,659 | 10/1995 | Nealson et al. ........................... | 375/202 |
| 5,491,741 | 2/1996 | Farwell et al. ........................... | 370/347 |
| 5,502,713 | 3/1996 | Lagerqvist et al. ...................... | 370/252 |
| 5,598,422 | 1/1997 | Longwell et al. ........................ | 371/37.1 |

FOREIGN PATENT DOCUMENTS

| | | |
|---|---|---|
| 0 179 465 A2 | 4/1986 | European Pat. Off. . |
| 0 278 700 A2 | 8/1988 | European Pat. Off. . |
| 0 439 649 A1 | 8/1991 | European Pat. Off. . |
| 0 689 312 A2 | 12/1995 | European Pat. Off. . |

Primary Examiner—Trinh L. Tu
Attorney, Agent, or Firm—Sylvia Chen

[57] ABSTRACT

A syndrome-based channel quality or message structure determiner (160) uses syndrome vectors to estimate the quality of a received signal in a variable message structure communication system. A digital signal from analog-to-digital converter (150) is separated into multiple branching paths, one for each potential message structure type. In a single path, a digital demodulator (221) demodulates the digital signal to produce a demodulated received signal. A deinterleaver (222) deinterleaves the demodulated received signal, and a symbol-by-symbol detector (2231) hard-decision detects the deinterleaved signal. For each hard-decision vector, at least one syndrome calculator (2241) calculates a syndrome vector. The syndrome vector is analyzed by a syndrome error estimator (2251) having an associated syndrome pattern memory (2271). A comparator (260) analyzes error counter totals from each syndrome error estimator.

17 Claims, 4 Drawing Sheets

SYNDROME-BASED CHANNEL QUALITY OR MESSAGE STRUCTURE DETERMINER

CROSS REFERENCE TO RELATED APPLICATIONS

This application is related to U.S. patent application Ser. No. 08/877,845 by inventors Meir Ariel and Reuven Meidan entitled "Soft-Decision Syndrome-Based Decoder for Convolutional Codes." The related application is filed on even date herewith, is assigned to the assignee of the present application, and is hereby incorporated herein in its entirety by this reference thereto.

FIELD OF THE INVENTION

This invention relates generally to communication systems, and more particularly to a message structure determiner for use in a receiver of a convolutional code communication system.

BACKGROUND OF THE INVENTION

Convolutional codes are often used in wireless digital communication systems to protect transmitted information from error. In one type of variable message structure communication system, a transmitter selects one of n convolutional codes $C_1, \ldots, C_i, \ldots, C_n$ to encode data. The receiver, however, generally does not know which message structure was selected by the transmitter and hence which convolutional code C was used by the transmitter.

In another type of variable message structure communication system, only a single convolutional code C is used, but the data transmission rate varies. For example, communication systems governed by the Interim Standard IS-95 specification adopted by the Telecommunications Industry Association (TIA) for Direct Sequence Code Division Multiple Access (DS-CDMA) are capable of using variable data rate transmissions. The transmitter convolutionally encodes data at a certain data rate and then uses repetition to generate transmitted symbol sequences with uniform symbol rates. In such a system, however, the receiver generally does not know which message structure was selected by the transmitter and hence which data rate was used by the transmitter.

Aside from using different convolutional codes and various data transmission rates, different message lengths or different types of interleavers can be used to vary the particular message structure. Also, there variable properties may be combined, for example, different types of interleavers may also use various message lengths. Throughout, the receiver generally does not know at least one of the properties listed above and used by the variable message structure transmitter.

Consequently, in a receiver of a variable message structure system, a received signal is demodulated and decoded in parallel using each of the possibly transmitted message structures. Parallel soft-decision maximum likelihood decoders, such as Viterbi decoders, produce the lowest bit error rate (BER) for a received signal. Once the received signal is decoded at all of the potential message structures, the decoded sequence with the lowest BER is selected as the properly decoded signal.

At the receiver, a practical soft-decision decoder, such as a Viterbi decoder, uses a trellis structure to perform an optimum search for the maximum likelihood transmitted vector. The Viterbi algorithm, however, is computationally complex, and its complexity increases exponentially with increasing constraint length. This essentially means that a Viterbi decoder requires a significant amount of current and a tremendous millions of instructions per second (MIPS) capability for processing convolutional codes with large constraint lengths. For variable message structure decoding, multiple Viterbi decoders are required which increases the computational complexity yet another level.

After a Viterbi decoder computes a maximum likelihood transmitted vector from a received signal, a message quality determiner can determine the quality of the decoded vector. If the quality is below a certain threshold, the received signal is deemed unreliable due to too many transmission errors. In this case, the decoded vector is processed by a higher level of the communication system. For example, the higher level of the communication system can decide to discard the unreliable decoded vector, replace the unreliable decoded vector with another decoded vector, or request retransmission of the unreliable decoded vector.

If the BER of a received vector could be estimated before soft-decision decoding the vector, the vector could be discarded or replaced before being processed by the computationally intensive Viterbi decoder. Thus, there is a need for estimating the quality of a received vector before the vector is soft-decision decoded. There is also a need for a maximum likelihood decoder with reduced complexity for use in variable code convolutional coding communication systems.

DETAILED DESCRIPTION OF THE PREFERRED EMBODIMENT

Figure 1:
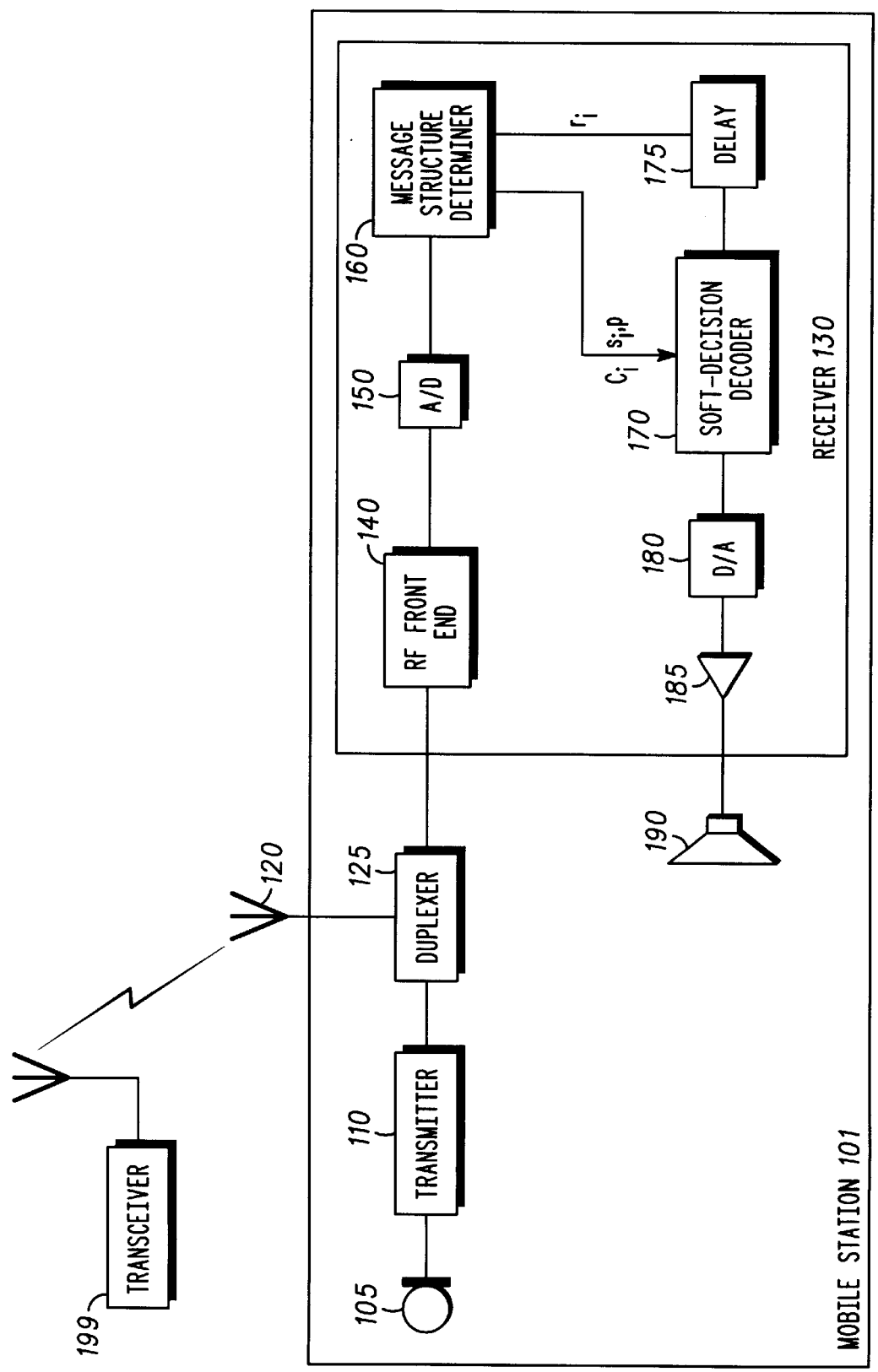
FIG. 1 shows a block diagram of a communication system having a code determiner according to a preferred embodiment.

A syndrome-based channel quality and message structure determiner uses syndrome vectors to estimate the quality of a received signal in a variable message structure communication system. Let $r_1, \ldots, r_i, \ldots, r_l$ denote received signals demodulated according to various demodulation schemes that are usable by the communication system. Then each vector r is a vector of real numbers of length N. Let $v_i$ denote the vector obtained by the symbol-by-symbol detection of demodulated received signal vector $r_i$. If the valid hard-decision symbols are binary, then $v_i$ is a vector of length N having element values of either 0 or 1. Let us denote $v_i = c + e$, where c is the transmitted code vector. Then e is the transmission error vector. For each potential convolutional code $C_1, \ldots, C_i, \ldots, C_n$ there exists a scalar parity check matrix $H_1, \ldots, H_i, \ldots, H_n$ with M columns and N rows having binary symbols of 0 and 1 as components. The parity check condition that satisfies the transmitted code vector c is expressed by the relationship $H_i c^t = 0$, where superscript t denotes vector transposition. In other words, if c is a code vector belonging to convolutional code $C_i$ (i.e., c is a transmitted code vector and $c \epsilon C_i$), then $H_i c^t = 0$, where $H_i$ is a matrix having M rows and N columns, c is a row vector of length N, and superscript t denotes vector transposition.

A syndrome vector $s_i$ is a binary vector of length M defined as $s_i = H_i v_i^t$. Because $v_i = c + e$, $s_i = H_i(c+e)^t$, and because $H_i c^t = 0$, then $s_i = H_i e^t$. When a syndrome vector $s_i = 0$, the most likely transmission error vector e=0, and no soft-decision maximum likelihood decoding is required. In other words, the symbol-by-symbol detected vector $v_i$ is the maximum likelihood soft-decision decoded transmitted code vector, and soft-decision decoding of the received signal vector $r_i$ is unnecessary.

When syndrome vector $s_i \neq 0$, transmission error is detected. The non-zero syndrome vector also identifies a coset of the code. This coset contains all the possible vectors of deviations from the symbol-by-symbol hard decisions. Thus, a non-zero syndrome vector can also be used as an estimator of bit error rate (BER) which in turn is indicative of the quality of the demodulated received vector. This BER estimate can be used to determine whether the received signal is unreliable due to too many transmission errors before soft-decision decoding of the received signal vector.

For a simplified soft-decision syndrome decoder in a variable data transmission rate convolutional coding system, such as IS-95, a message structure determiner has parallel digital demodulators, each optimized to a potential data rate. Next, a symbol-by-symbol detector initially detects each demodulated received signal. Parallel syndrome calculators compute a syndrome vector for each potential data rate from associated parity check matrices and the symbol-by-symbol detector's outputs. Then, parallel syndrome error estimators compare known syndrome error patterns to the syndrome vector in order to find errors in the hard-decision detected vector and approximate the BER of the received signal.

Assuming that the BER corresponding to the correctly decoded signal is considerably lower than the BERs corresponding to the other decoded signals, the decoding data rate producing the lowest BER is sent to a soft-decision decoder for use in generating maximum likelihood decoded data. Thus, in a variable rate convolutional code environment, a simplified soft-decision syndrome decoder reduces computational complexity by determining the most likely transmitted data rate without fully soft-decision decoding at each potential data rate.

Variations on this message structure determiner include parallel deinterleavers inserted between the parallel demodulators and the symbol-by-symbol detector for use in variable interleaver communication systems. Other variations include collapsing parallel demodulators or deinterleavers into a single demodulator or deinterleaver, or expanding a single symbol-by-symbol detector or syndrome calculator into parallel symbol-by-symbol detectors or syndrome calculators, depending on whether parallel computations are required.

The BER estimation is based on the observation that the composition of the syndrome vector is related to the number of transmission errors and to their distribution in the received vector. An optimum lower bound on the number of errors is the Hamming weight of the coset leader. The coset leader is the coset member with the minimum Hamming weight among all the vectors belonging to the coset identified by the syndrome vector. Unfortunately, selecting the Hamming weight of the coset leader as the estimated number of errors is usually not possible in the case of convolutional codes, because the collection of cosets is vast. For example, the GSM half-rate vocoder convolutional code has $2^{113}$ cosets. Storing all of those cases in a computer memory is practically impossible. Thus, there is a use for a syndrome-based method of determining BER that has reasonable memory and computational requirements.

Let $e_p$ denote a likely transmission error pattern in the hard-decision vector v, such as a single-bit transmission error or a double-bit transmission error. Due to the structure of scalar parity check matrices, there is a limited number of syndrome patterns that correspond to single-symbol hard-decision vector errors. Let $s_p = He_p^t$, then $s_p$ is a complete syndrome vector of length M. Let syndrome pattern p be a segment of $s_p$ starting from the first nonzero element in $s_p$ and ending with the last nonzero element of $s_p$. Weight $\beta_p$ is the Hamming weight of the most likely error pattern that could have caused syndrome pattern p. Assume that $\beta_p$ is the minimum among all the cardinalities of the possible error patterns.

A BER estimate is performed by first setting an error counter to zero and calculating a syndrome vector. The syndrome vector is then examined for syndrome patterns. Once a syndrome pattern p is identified, the error counter is incremented by the corresponding Hamming weight $\beta_p$ and the syndrome pattern p is subtracted from the syndrome vector. If a syndrome pattern that is not previously known is encountered during the examination of the syndrome vector, the message structure determiner estimates the cardinality of the error as a Hamming weight $\beta_e$ and updates the error counter accordingly. The cardinality estimation is based on the length of the syndrome pattern as determined by computer simulations and experimental data. A larger number of known syndrome patterns decreases the amount of cardinality estimations that need to be made and likewise increases the accuracy of the message structure determiner.

Because the message structure determiner determines the quality of a received signal prior to the signal being decoded, the message structure determiner is especially useful for determining when a received vector should be transferred to a higher decision level due to a high BER. Thus, the message structure determiner can also include a threshold of the number of detectable errors. The threshold is set such that when the threshold is exceeded, the Viterbi decoder is likely to fail in correct decoding. Hence, the vector can be transferred to a higher decision level to reduce the number of computations required by the Viterbi decoder.

FIG. 1 shows a block diagram of a communication system 100 having a message structure determiner 160 according to a preferred embodiment. The receiver 130 is shown as part of a cellular radiotelephone mobile station 101, however, the receiver may alternately be part of a facsimile machine, modulator-demodulator (MODEM), two-way radio, or other communication device that receives convolutionally encoded signals. In the mobile station 101, a microphone 105 picks up audio signals which are then modulated by a transmitter 110 and broadcast by an antenna 120 through a duplexer 125. The antenna 120 also receives radio frequency (RF) signals from a complementary transmitter in a transceiver 199 such as a cellular base station. In the receiver 130, an RF front end 140 steps down the received RF signal to an analog baseband signal. An analog-to-digital (A/D) converter 150 converts the analog baseband signal to a digital signal.

The digital signal is connected to the message structure determiner 160 which will be explained in further detail with reference to FIG. 2. The message structure determiner 160 selects the most likely message structure used by the transmitter. Various properties of the most likely message structure, such as the convolutional code $C_i$, the syndrome vector $s_i$, and found syndrome error patterns p, are preferably sent to a soft-decision decoder such as the syndrome-based decoder described in U.S. patent application Ser. No. 08/877,845 by inventors Meir Ariel and Reuven Meidan entitled "Soft-Decision Syndrome-Based Decoder for Convolutional Codes."

The demodulated received signal vector $r_i$ corresponding to the most likely message structure is also connected to the soft-decision decoder 170. A delay 175 is used to synchronize the arrival of the additional information, such as the convolutional code $C_i$, the syndrome vector $s_i$, and the syndrome patterns p, from the message structure determiner 160. At the output of the soft-decision decoder 170, a digital-to-analog (D/A) converter 180 converts the maximum likelihood soft-decision decoded signal to the analog domain, and an audio amplifier 185 uses operational amplifiers to increase the gain of the recovered signal for reproduction through audio speaker 190.

Figure 2A:
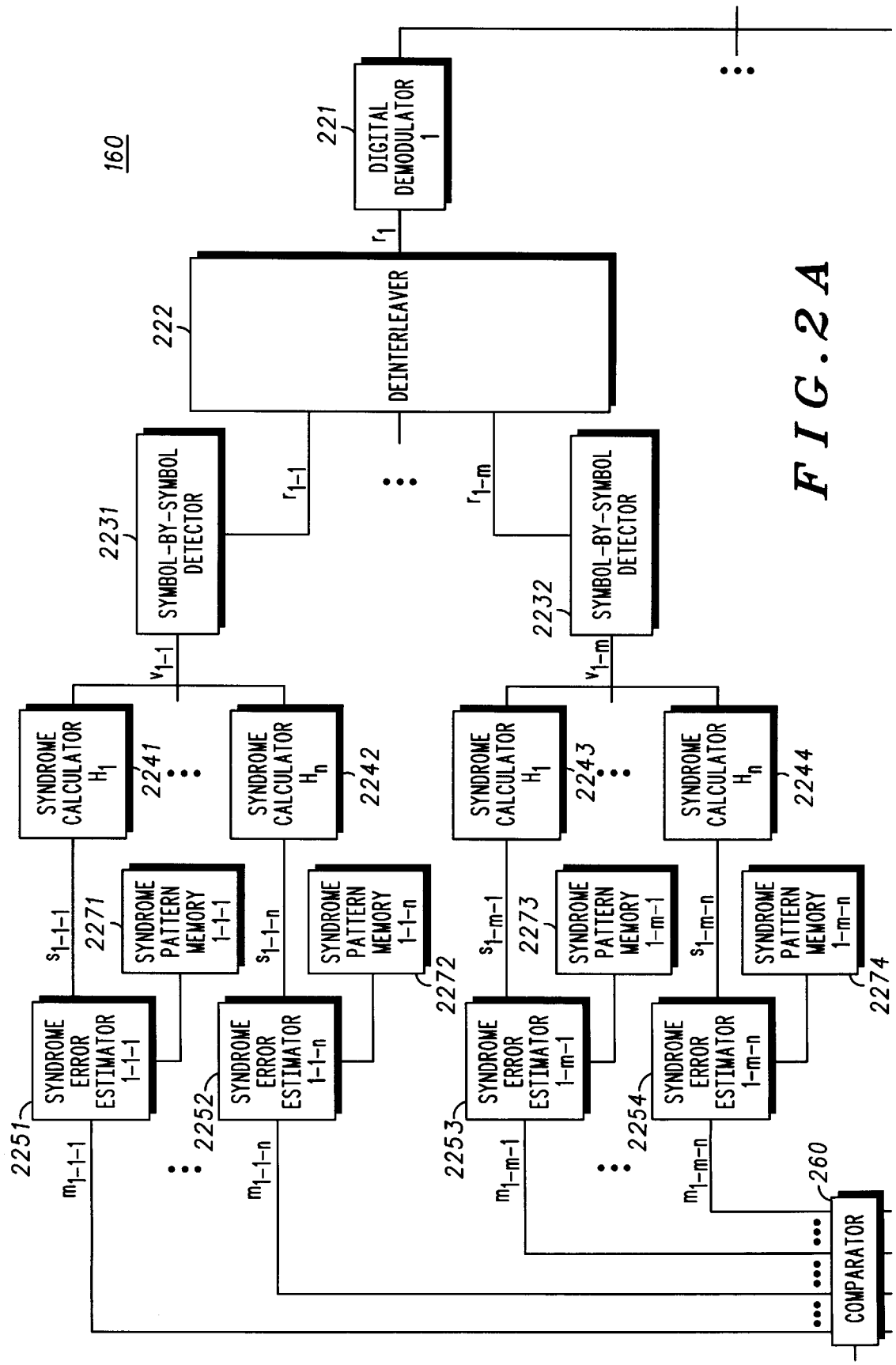
FIG. 2A and FIG. 2B show a block diagram of the code determiner shown in FIG. 1 according to the preferred embodiment.
Figure 2B:
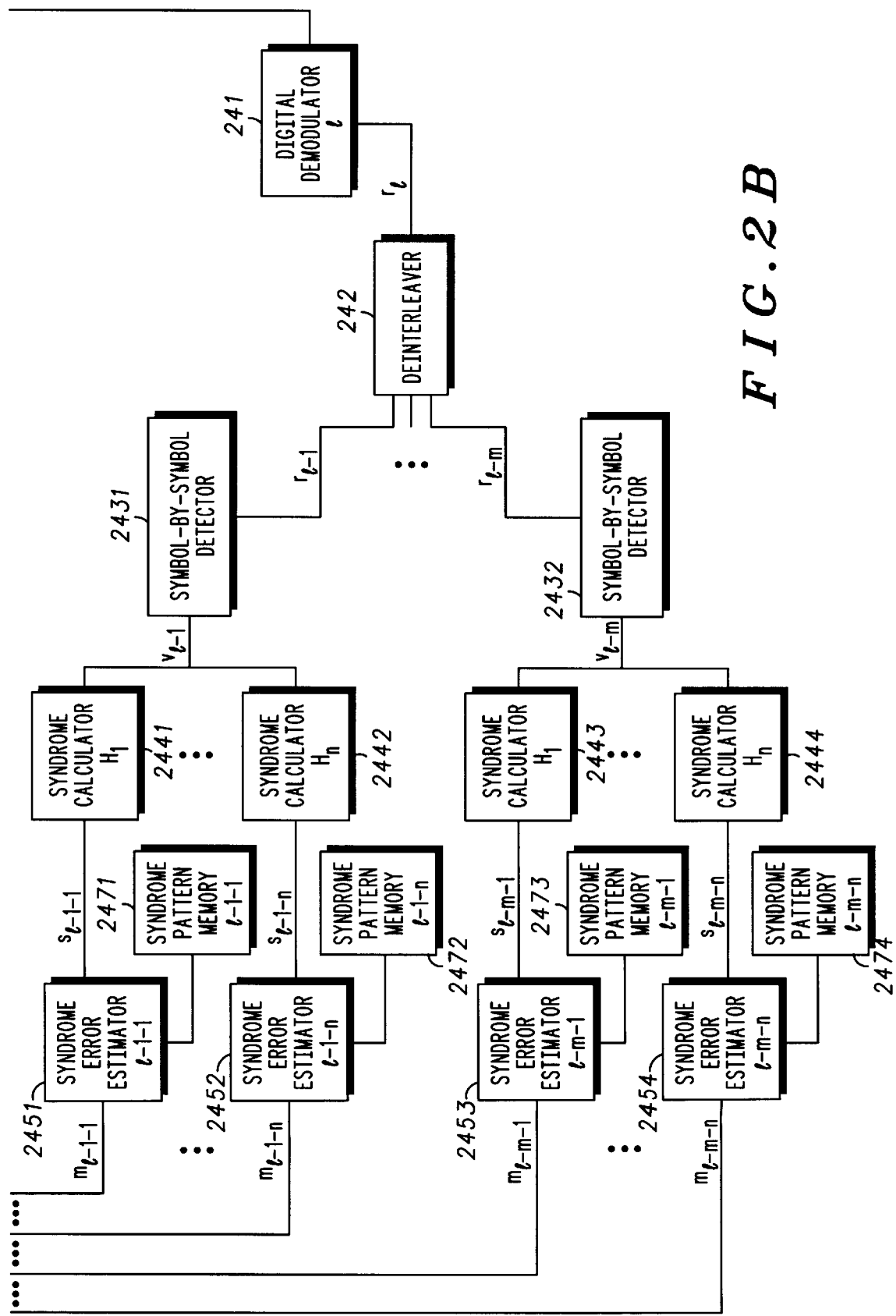

FIG. 2 shows a block diagram of the message structure determiner 160 shown in FIG. 1 according to the preferred embodiment. In a variable message structure convolutional coding environment, the message structure determiner 160 uses syndrome vectors to estimate the BER of symbol-by-symbol detected data to ascertain the received signal quality and determine the most likely transmitted message structure. In this embodiment, the transmitted message structure can be varied in length, type of interleaving, source data rate, convolutional code used, and any combination of the above. This embodiment may also be modified to allow only certain properties to be varied or only allow certain combinations of the above properties to be varied.

The message structure determiner 160 ascertains the most likely message structure of the transmitted signal and communicates the corresponding demodulated received signal $r_i$ to a soft-decision decoder 170 for use in maximum likelihood decoding. In the message structure determiner 160, a digital signal from analog-to-digital converter 150 shown in FIG. 1 is separated into l×m×n branching paths, one for each potential message structure type, with l being the number of potential demodulators, m being the number of potential interleavers, and n being the number of potential convolutional codes.

In each path, one of digital demodulators 221, 241 demodulates the digital signal to produce multiple demodulated received signals $r_1, \ldots, r_i, \ldots, r_l$. Let m be the number of potential interleaver types used by the transmitter. Each of the l parallel deinterleavers 222, 242 processes each demodulated received signal to produce l×m reordered received signals $r_{1-1}, \ldots, r_{1-m}, \ldots, r_{i-1}, \ldots, r_{i-m}, \ldots, r_{l-1}, \ldots, r_{l-m}$. Note that block length is often coupled with interleaver type, and thus each deinterleaver may produce a different block length.

Parallel symbol-by-symbol detectors 2231, 2232, 2431, 2432 detect the multiple reordered received signals to produce hard-decision vectors $v_{1-l}, \ldots, v_{1-m}, \ldots, v_{i-1}, \ldots, v_{i-m}, \ldots, v_{l-1}, \ldots, v_{l-m}$. Each symbol-by-symbol detector merely examines the incoming signal without regard for the value of the surrounding symbols to produce the hard-decision vectors. Because each symbol-by-symbol detector is identical, the individual symbol-by-symbol detectors 2231, 2232, 2431, 2432 could be implemented using a single time-shared symbol-by-symbol detector. Each hard-decision vector is multiplied by parity check matrices $H_1, \ldots, H_i, \ldots, H_n$ in parallel syndrome calculators 2241, 2242, 2243, 2244, 2441, 2442, 2443, 2444 to produce l×m×n syndrome vectors $s_{1-1-1}, \ldots, s_{1-1-n}, \ldots, s_{1-m-1}, \ldots, s_{1-m-n}, \ldots, s_{i-1-1}, \ldots, s_{i-1-n}, \ldots, s_{i-m-1}, \ldots, s_{i-m-n}, \ldots, s_{l-1-1}, \ldots, s_{l-1-n}, \ldots, s_{l-m-1}, \ldots, s_{l-m-n}$.

Each syndrome vector is separately analyzed in one of the l×m×n parallel syndrome error estimators 2251, 2252, 2253, 2254, 2451, 2452, 2453, 2454 for the presence of syndrome patterns. Known syndrome patterns related to each parity check matrix are stored in syndrome pattern memories 2271, 2272, 2273, 2274, 2471, 2472, 2473, 2474 along with their associated Hamming weights $\beta_p$. The Hamming weight $\beta_p$ of the most likely hard-decision vector error pattern $e_p$ that could have been the cause for syndrome pattern p is defined as the minimum among all the cardinalities of the possible error patterns.

The Hamming weights of each syndrome pattern found in a syndrome vector are added together in error counters $m_{1-1-1}, \ldots, m_{1-1-n}, \ldots, m_{1-m-1}, \ldots, m_{1-m-n}, \ldots, m_{i-1-1}, \ldots, m_{i-1-n}, \ldots, m_{i-m-1}, \ldots, m_{i-m-n}, \ldots, m_{l-1-1}, \ldots, m_{l-1-n}, \ldots, m_{l-m-1}, \ldots, m_{l-m-n}$ to estimate the BER at each potential message structure. Comparator 260 compares the error counter totals from the syndrome error estimators 2251, 2252, 2253, 2254, 2451, 2452, 2453, 2454, and the demodulated received signal $r_i$ corresponding to the lowest error counter total is given to the soft-decision decoder 170 (shown in FIG. 1). Additional information, such as the deinterleaved signal, convolutional code, and found error patterns corresponding to the lowest BER message structure can also be given to the soft-decision decoder 170.

If the difference between the lowest error count total and the second lowest error count total is not significant, or if all the error counts are above a given threshold value, then the received signal is unreliable probably due to too many transmission errors. In this case, the vector is transferred to a higher decision level and not processed by the soft-decision decoder 170 (shown in FIG. 1). Note that if the candidate convolutional codes have different lengths, as in IS-95, then the error counter values must be normalized by the comparator 260 before the comparison in completed.

The message structure determiner 160 adds very little overhead if a syndrome-based decoder is employed as the soft-decision decoder 170. The results of the syndrome calculator and the matched syndrome patterns can be fed into the syndrome-based decoder for further processing. If a Viterbi decoder is used as the soft-decision decoder 170, more overhead is required, however, the message structure determiner 160 is more efficient than multiple Viterbi decoders in parallel.

This code determiner can be used in combination with other means of checking the reliability of the received signals prior to soft-decision maximum likelihood decoding. One such measure of reliability is the sum of the absolute values of the log likelihood ratios of the hard-decisions, namely:

$$\sum_{i=1}^{N} |\log p(r_i \mid c_i = 1) - \log p(r_i \mid c_i = 0)|$$

where p (r|c) is the conditional probability of receiving element r given that the transmitted symbol is element c.

The preferred embodiment shown in FIG. 2 can be easily tailored to the type of communication system being implemented. For example, if all the potential message structures have the same block length and same interleaving then there is only one possible sequence of hard-decision vectors v as determined by a single digital demodulator, deinterleaver, and symbol-by-symbol detector, but still as many distinct syndrome vectors as parity check matrices. Thus, under these circumstances, the separate digital demodulators 221, 241 could be replaced by a single digital demodulator, the deinterleaver 222 would only produce one output $r_{1-1}$, and only a single symbol-by-symbol detector 2231 would be needed. The separate syndrome calculators 2241, 2242 and syndrome error estimators 2251, 2252 with corresponding syndrome pattern memories 2271, 2272, however, would remain distinct.

For a communication system with no interleaving where the block length changes but the convolutional code remains constant, we note that the longest possible demodulated received signal r contains information relating to the shorter possible block lengths. Thus, the message structure determiner 160 can simply calculate a single, longest possible syndrome vector from the longest possible demodulated received signal and its associated parity check matrix. The longest possible syndrome vector can then be truncated according to the potential block lengths and analyzed for errors. The multiple digital demodulators, symbol-by-symbol detectors, and syndrome calculators can each be replaced by a single element, and the multiple deinterleavers can be removed from the message structure determiner. The output of the syndrome calculator would then feed subsets of the longest possible syndrome vector to multiple syndrome error estimators for signal quality analysis. Still other combinations of the variable properties of message structures can be made and implemented in the message structure determiner 160.

Also, if the communication system transmitter is only allowed to change, for example, the interleaver type at certain intervals, once the message structure determiner determines the proper deinterleaver to use, this knowledge can be used dynamically to degenerate the message structure determiner 160 to a branch having only one deinterleaver during the remainder of the constant interleaver type interval. This interval or dynamic degeneration can be used to simplify the message structure determiner 160 to reduce the number of branches and thus the computational complexity from the case shown in FIG. 2.

A highly simplified version of the message structure determiner 160 can be used as a channel quality estimator. Even if all of the transmitted message structure properties are known to the receiver, a degenerated version of the message structure determiner, such as a single branch, can be used to estimate the BER of the received signal. In this situation, the received signal is directed to the proper digital demodulator 221, deinterleaver 222, symbol-by-symbol detector 2231, and syndrome calculator 2241. The proper syndrome error estimator 2251 estimates the BER of the symbol-by-symbol hard-decision vector $v_{1-1}$. The comparator 260 compares the BER to a predetermined threshold, rather than the BERs calculated in the other branches, in order to determine whether the soft-decision decoder would be unsuccessful, or the comparator 260 is eliminated and the BER simply passes to a channel quality monitor.

Figure 3:
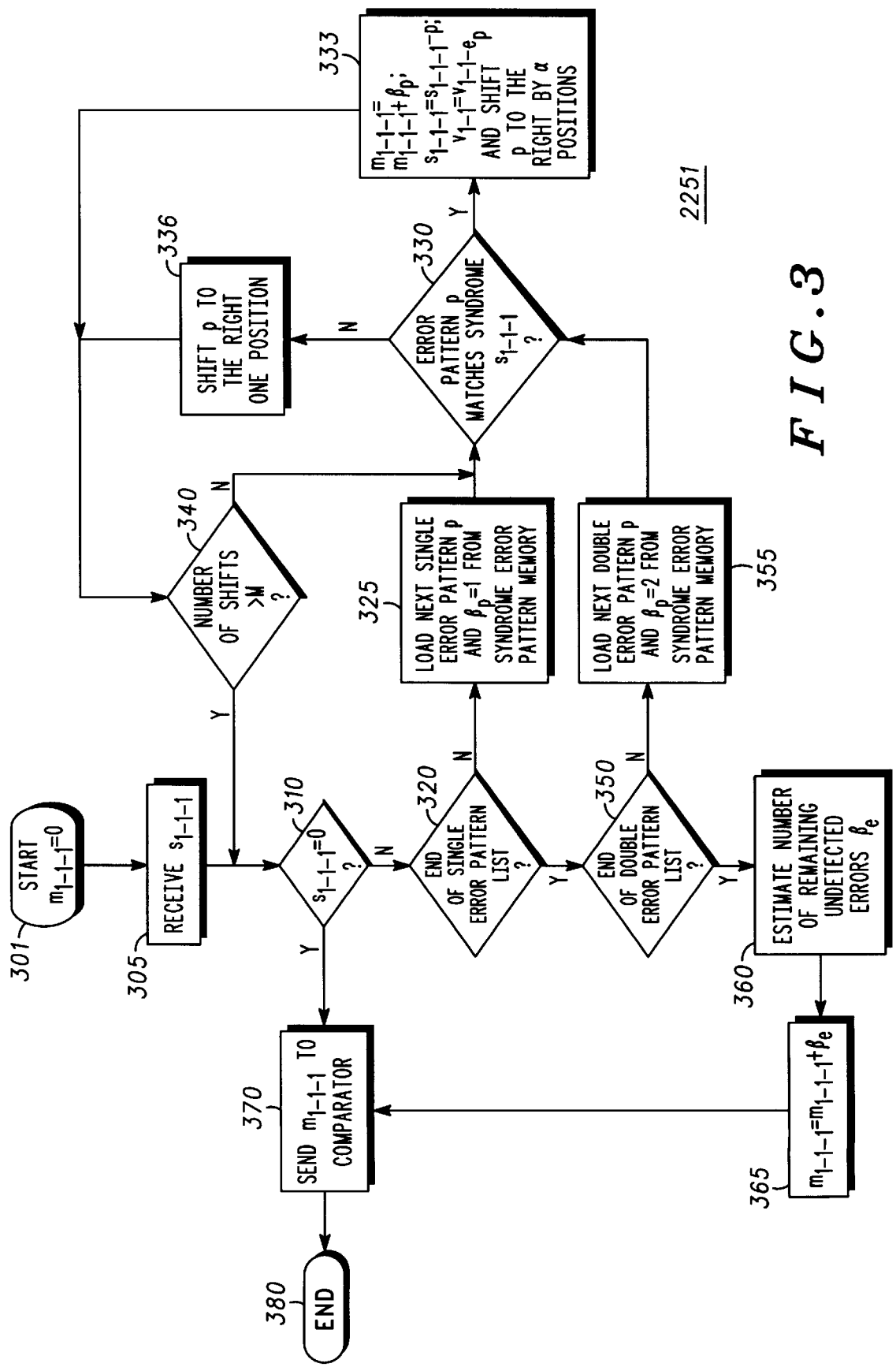
FIG. 3 shows a flow chart of the operation of the syndrome error estimators shown in FIG. 2 according to the preferred embodiment.

FIG. 3 shows a flow chart of the operation of the syndrome error estimators shown in FIG. 2 according to the preferred embodiment. Syndrome error estimator 2251 is shown as an example; each syndrome error estimator 2251, 2252, 2253, 2254, 2451, 2452, 2453, 2454 shown in FIG. 2 operates in a similar manner. During the start step 301, the error counter $m_1$ associated with the syndrome error estimator 2251 is reset to zero at the beginning of the vector. In step 305, the syndrome error estimator 2251 receives a syndrome vector $s_{1-1-1}$ from its associated syndrome calculator 2241. If, at this time, the syndrome vector $s_{1-1-1}=0$ as determined in step 310, then the convolutional code vector $C_1$ corresponding to the scalar parity check matrix $H_1$ used by the syndrome calculator 2241 is probably the correct transmission code, the error counter value $m_{1-1-1}=0$ is sent to the comparator 260 (shown in FIG. 2) in step 360, and the error estimate procedure is ended in step 370. Notice that if syndrome vector $s_{1-1-1}=0$ at this stage, then the decoding is also complete, because the vector $v_{1-1}$ from symbol-by-symbol detector 2231 (shown in FIG. 2) is also the most likely symbol sequence as calculated using a soft-decision decoder. This case, however, is unlikely to occur.

If the syndrome vector $s_{1-1-1} \neq 0$ as determined in step 310, the syndrome error estimator 2251 searches through the syndrome vector $s_{1-1-1}$ for known syndrome patterns p. This search is performed in several iterations. At the first iteration, step 320 searches for only the syndrome patterns corresponding to isolated single-symbol errors in the hard-decision vector $v_{1-1}$. Observe that syndrome vector $s_{1-1-1}$ is a linear combination of the columns of the parity check matrix $H_1$ and, in the binary case, merely a sum of columns of $H_1$. A single error in a hard-decision detected vector produces a syndrome vector which equals the corresponding column of the parity check matrix $H_1$. On the other hand, if multiple hard-decision errors are clustered, then their corresponding single-error syndrome patterns will overlap to generate a multiple-error syndrome pattern that can no longer be easily identified.

Due to the structure of parity check matrices, there is a limited number of syndrome patterns that correspond to single-symbol hard-decision errors. For instance, the scalar parity check matrix of a rate half binary convolutional code contains only two types of syndrome patterns that correspond to single-symbol hard-decision errors. In other words, all the columns of this type of parity check matrix are shifted versions of the first two columns. For punctured convolutional codes, the number of different syndrome patterns that correspond to single-symbol hard-decision errors is greater than for non-punctured codes, but still it is usually small enough to enable a relatively simple implementation of a message structure determiner.

Step 325 loads the next single-error syndrome pattern p and its associated Hamming weight $\beta_p$, which equals 1, from an associated syndrome pattern memory 2271 (shown in FIG. 2). Decision step 330 looks for a match between the syndrome pattern p as initially loaded and the syndrome vector $s_{1-1-1}$. If the syndrome vector does not match the loaded syndrome pattern, step 336 shifts the error pattern p to the right by one bit. Step 340 makes sure that the syndrome pattern p has not been shifted farther than the length M of the syndrome vector and continues to compare shifted versions of the syndrome pattern p to the syndrome vector $s_{1-1-1}$.

If the syndrome pattern p matches a syndrome vector segment, in step 333 the error counter $m_{1-1-1}$ is incremented by the Hamming weight $\beta_p=1$, the syndrome vector $s_{1-1-1}$ is modified to remove the syndrome pattern p, the hard-decision vector $v_{1-1}$ is modified to remove the error patter $e_p$ associated with the syndrome pattern, and the syndrome pattern is shifted to the right by $\alpha$ bits, where $\alpha<M$ and is the bit length of the syndrome pattern p. Once the syndrome pattern p has been compared to the entire syndrome vector, step 310 tests whether the modified syndrome vector is equal to zero. If the modified syndrome vector equals zero, the error counter value $m_{1-1-1}$ is sent to the comparator in step 370 and the error estimate sequence ends in step 380.

After all the single error patterns have been compared with the syndrome vector $v_{1-1}$, if the modified syndrome vector does not equal zero, then all the known double-error syndrome patterns are compared with the syndrome vector $s_{1-1-1}$ as shown in step 350. Step 355 instructs the syndrome error estimator to load the next double-error syndrome pattern p and its associated Hamming weight $\beta_p$, which equals 2, from the syndrome pattern memory 2271. Again, the syndrome error estimator looks for a match between the loaded syndrome pattern p and segments of the syndrome vector $s_{1-1-1}$ in step 330. If there is a match, the error counter, the syndrome vector, and the hard-decision vector are modified in step 333 by incrementing the error counter by $\beta_p=2$, removing the found double-error syndrome pattern p from the syndrome vector, removing the corresponding hard-decision vector error $e_p$, and shifting the syndrome pattern p by $\alpha$ bits to the right. If there is no match, step 336 shifts the syndrome pattern p only one bit to the right. Step 340 instructs the continuation of the comparison of shifted versions of the syndrome pattern p to the syndrome vector $s_{1-1-1}$ until the syndrome pattern p has been shifted beyond the length M of the syndrome vector $s_{1-1-1}$. This procedure can continue with triple-error syndrome patterns and other multiple-error syndrome patterns, however, in the preferred embodiment, only single-error and double-error syndrome patterns are removed.

If, after all the known single-error syndrome patterns and double-error syndrome patterns have been removed from the syndrome vector, the modified syndrome vector does not equal zero, the syndrome error estimator roughly predicts the Hamming weight $\beta_e$ of the remaining undetected errors in step 360. One estimation procedure assumes that any remaining errors have a Hamming weight equivalent to one-half of the length of the remaining syndrome patterns multiplied by the length of the hard-decision vector and then divided by the total length of the syndrome vector. For example, if the remaining syndrome patterns are thirty percent of the length of the syndrome vector, the estimated Hamming weight of the remaining errors is $0.5 \times 0.3 \times F$, where F is the number of bits in the hard-decision vector $v_{1-1}$. Alternately, a simpler estimation can be based on the percentage of non-zero bits in the syndrome vector. Step 365 increments the error counter $m_{1-1-1}$ by the estimated Hamming weight $\beta_e$. The value of error counter $m_{1-1-1}$ is sent to the comparator in step 370 and the syndrome error estimate procedure ends in step 380.

An advantage of the syndrome-based channel quality or message structure determiner is that the quality of a received vector can be estimated before soft-decision decoding the vector. The quality can then be used to determine the transmitted convolutional code in a variable message structure communication system. The quality can also be used to determine whether a vector has suffered from unrecoverable transmission errors and should be discarded before being processed by a soft-decision decoder. While specific components and functions of the syndrome-based channel quality or message structure determiner are described above, fewer or additional functions could be employed by one skilled in the art within the true spirit and scope of the present invention. The invention should be limited only by the appended claims.

We claim:

1. A syndrome-based channel quality or message structure determiner for use in a communication system receiver comprising:
    a first digital demodulator, for demodulating a received digital signal to produce a first demodulated received signal;
    a first symbol-by-symbol detector, coupled to the first digital demodulator, for computing a first hard-decision vector from the first demodulated received signal;
    a first syndrome calculator, coupled to the first symbol-by-symbol detector, for using a first scalar parity check matrix to compute a first syndrome vector from the first hard-decision vector;
    a first syndrome pattern memory for storing a first syndrome pattern and an associated first error weight; and
    a first syndrome error estimator, coupled to the first syndrome calculator and the first syndrome pattern memory, for locating and removing the first syndrome pattern from the first syndrome vector and calculating a first quality estimation from the first error weight.

2. A syndrome-based channel quality or message structure determiner according to claim 1 further comprising:
    a comparator, coupled to the first syndrome error estimator, for comparing the first quality estimation to a second quality estimation.

3. A syndrome-based channel quality or message structure determiner according to claim 2 wherein the second quality estimation is a predetermined error weight.

4. A syndrome-based channel quality or message structure determiner according to claim 1 further comprising:
    a second syndrome calculator, coupled to the first symbol-by-symbol detector, for using a second scalar parity check matrix to compute a second syndrome vector from the first hard-decision vector;
    a second syndrome pattern memory for storing a second syndrome pattern and an associated second error weight; and
    a second syndrome error estimator, coupled to the second syndrome calculator and the second syndrome pattern memory, for locating and removing the second syndrome pattern from the second syndrome vector and calculating a second quality estimation from the second error weight.

5. A syndrome-based channel quality or message structure determiner according to claim 4 further comprising:
    a comparator, coupled to the first syndrome error estimator and the second syndrome error estimator, for comparing the first quality estimation to the second quality estimation.

6. A syndrome-based channel quality or message structure determiner according to claim 1 further comprising:
    a second digital demodulator, for demodulating the received digital signal to produce a second demodulated received signal;
    a second symbol-by-symbol detector, coupled to the second digital demodulator, for computing a second hard-decision vector from the second demodulated received signal;
    a second syndrome calculator, coupled to the second symbol-by-symbol detector, for using a second scalar parity check matrix to compute a second syndrome vector from the second hard-decision vector;
    a second syndrome pattern memory for storing a second syndrome pattern and an associated second error weight; and
    a second syndrome error estimator, coupled to the second syndrome calculator and the second syndrome pattern memory, for locating and removing the second syndrome pattern from the second syndrome vector and calculating a second quality estimation from the second error weight.

7. A syndrome-based channel quality or message structure determiner according to claim 6 further comprising:
    a comparator, coupled to the first syndrome error estimator and the second syndrome error estimator, for comparing the first quality estimation to the second quality estimation.

8. A syndrome-based channel quality or message structure determiner for use in a communication system receiver comprising:

a first digital demodulator, for demodulating a received digital signal to produce a first demodulated received signal;

a first deinterleaver, coupled to the first digital demodulator, for deinterleaving the first demodulated received signal to produce a first deinterleaved signal;

a first symbol-by-symbol detector, coupled to the first deinterleaver, for computing a first hard-decision vector from the first deinterleaved signal;

a first syndrome calculator, coupled to the first symbol-by-symbol detector, for using a first scalar parity check matrix to compute a first syndrome vector from the first hard-decision vector;

a first syndrome pattern memory for storing a first syndrome pattern and an associated first error weight; and a first syndrome error estimator, coupled to the first syndrome calculator and the first syndrome pattern memory, for locating and removing the first syndrome pattern from the first syndrome vector and calculating a first quality estimation from the first error weight.

9. A syndrome-based channel quality or message structure determiner according to claim 8 wherein the first deinterleaver also produces a second deinterleaved signal.

10. A syndrome-based channel quality or message structure determiner according to claim 9 further comprising:

a second symbol-by-symbol detector, coupled to the first deinterleaver, for computing a second hard-decision vector from the second deinterleaved signal;

a second syndrome calculator, coupled to the second symbol-by-symbol detector, for using a second scalar parity check matrix to compute a second syndrome vector from the second hard-decision vector;

a second syndrome pattern memory for storing a second syndrome pattern and an associated second error weight; and a second syndrome error estimator, coupled to the second syndrome calculator and the second syndrome pattern memory, for locating and removing the second syndrome pattern from the second syndrome vector and calculating a second quality estimation from the second error weight.

11. A syndrome-based channel quality or message structure determiner according to claim 10 further comprising:

a comparator, coupled to the first syndrome error estimator and the second syndrome error estimator, for comparing the first quality estimation to the second quality estimation.

12. A cellular radiotelephone comprising:

a syndrome-based channel quality or message structure determiner including:

a digital demodulator, for demodulating a received digital signal to produce a demodulated received signal;

a symbol-by-symbol detector, coupled to the digital demodulator, for computing a hard-decision vector from the demodulated received signal;

a syndrome calculator, coupled to the symbol-by-symbol detector, for using a scalar parity check matrix to compute a syndrome vector from the hard-decision vector;

a syndrome pattern memory for storing a syndrome pattern and an associated error weight; and a syndrome error estimator, coupled to the syndrome calculator and the syndrome pattern memory, for locating and removing the syndrome pattern from the syndrome vector and calculating a quality estimation from the error weight.

13. A cellular radiotelephone according to claim 12 wherein the syndrome-based channel quality or message structure determiner further comprises:

a comparator, coupled to the syndrome error estimator, for comparing the quality estimation to a predetermined error weight.

14. A method for determining a transmitted signal's quality or message structure comprising the steps of:

demodulating a received digital signal to produce a first demodulated received signal;

computing a first hard-decision vector from the first demodulated received signal;

using a first scalar parity check matrix to compute a first syndrome vector from the first hard-decision vector; and locating and removing a first syndrome pattern from the first syndrome vector and calculating a first quality estimation from a first error weight.

15. A method for determining a transmitted signal's quality or message structure according to claim 14 further comprising the step of:

comparing the first quality estimation to a second quality estimation.

16. A method for determining a transmitted signal's quality or message structure according to claim 14 further comprising the steps of:

using a second scalar parity check matrix to compute a second syndrome vector from the first hard-decision vector; and locating and removing a second syndrome pattern from the second syndrome vector and calculating a second quality estimation from a second error weight.

17. A method for determining a transmitted signal's quality or message structure according to claim 16 further comprising the steps of:

comparing the first quality estimation to the second quality estimation.

* * * * *